(12) United States Patent  
Deych

(10) Patent No.: US 7,388,208 B2
(45) Date of Patent: Jun. 17, 2008

(54) DUAL ENERGY X-RAY DETECTOR

(76) Inventor: Ruvin Deych, 91 Locust St., Burlington, MA (US) 01803

( * ) Notice: Subject to any disclaimer, the term of this patent is extended or adjusted under 35 U.S.C. 154(b) by 0 days.

(21) Appl. No.: 11/329,658

(22) Filed: Jan. 11, 2006

(65) Prior Publication Data

US 2007/0158573 A1  Jul. 12, 2007

(51) Int. Cl.
*G01T 1/20* (2006.01)
(52) U.S. Cl. .................. 250/370.11; 250/367; 378/98.9
(58) Field of Classification Search .......... 250/370.11, 250/367; 378/98.9
See application file for complete search history.

(56) References Cited

U.S. PATENT DOCUMENTS

| | | | | |
|---|---|---|---|---|
| 4,511,799 A | * | 4/1985 | Bjorkholm | 250/367 |
| 4,933,562 A | * | 6/1990 | Roziere | 250/367 |
| 5,117,114 A | * | 5/1992 | Street et al. | 250/370.11 |
| 5,352,896 A | * | 10/1994 | Brown | 250/368 |
| 5,548,123 A | * | 8/1996 | Perez-Mendez et al. | 250/370.11 |
| 5,831,269 A | * | 11/1998 | Nakamura et al. | 250/367 |
| 6,448,559 B1 | * | 9/2002 | Saoudi et al. | 250/367 |
| 6,553,092 B1 | * | 4/2003 | Mattson et al. | 378/19 |
| 6,570,160 B1 | * | 5/2003 | Maekawa et al. | 250/367 |
| 2004/0200971 A1 | * | 10/2004 | De Keyser | 250/370.09 |
| 2006/0067472 A1 | * | 3/2006 | Possin et al. | 378/98.9 |

* cited by examiner

*Primary Examiner*—Constantine Hannaher
*Assistant Examiner*—Jessica L Eley
(74) *Attorney, Agent, or Firm*—McDermott Will & Emery LLC

(57) ABSTRACT

A dual-energy x-ray detector includes a plurality of x-ray detector elements that detect x-rays that are generated by an x-ray source and that have passed through an object. Each of the x-ray detector elements includes a first scintillator layer adapted to convert x-rays from the x-ray source that have passed through the object into light of a first wavelength, and a second scintillator layer positioned behind the first scintillator layer and adapted to convert x-rays from the x-ray source that have passed through the object and through the first scintillator layer into light of a second wavelength. Each of the x-ray detector elements further includes a first optical sensor having a spectral sensitivity substantially matched to light of the first wavelength, and a second optical sensor having a spectral sensitivity substantially matched to light of the second wavelength.

18 Claims, 5 Drawing Sheets

DUAL ENERGY X-RAY DETECTOR

BACKGROUND

Dual energy x-ray imaging systems may use images that are created at different x-ray energies, in order to distinguish between materials of different atomic composition. Applications of dual-energy x-ray imaging systems may include, but are not limited to, bone densitometry, explosive detection, and quantitative CT (computed tomography).

In these systems, x-ray measurements at two energies may be used for selective material imaging. This approach is made possible because x-rays undergo different types of interactions with matter, at different energies. In the diagnostic range of x-ray energies up to 200 keV, x-rays interact with matter primarily through the Compton and photoelectric interactions. These two types of interactions depend differently on the energy of the incident x-rays: the cross-section for Compton scattering is proportional to the electron density of x-ray target material, while the photoelectric cross-section is proportional to the electron density times the atomic number (Z) cubed. By separately measuring x-ray attenuation at low and high energies, therefore, the Compton and photoelectric interactions can be independently measured. The results of the measurements depend on the type of the x-ray target material, not on the thickness or density of the target material.

A number of methods have been used to carry out dual energy x-ray imaging. One method uses monoenergetic sources, such as radionuclides. The use of radionuclides can lead to very long scan times, due to the low output of the sources. In bone densitometry, this may lead to motion artifacts. A second method approximates monoenergetic x-rays using kVp switched x-ray tubes. Since the measurements at low and high kVp settings are taken at different times, this method can also produce motion artifacts. Also, switching x-ray tube voltage at high frequencies can be technically complex.

A third method uses a single x-ray exposure and energy selective detector. Various configurations of a so-called "front-back detector" have been proposed in the past. Typically, a front-back detector is a two-layered solid state detector, with two scintillator elements, each coupled to a separate sensor, and positioned one in front of another. Both elements are in the path of the x-rays, so that the first element may be more sensitive to low energy x-rays (or all x-rays), and the second elements may sense hardened higher energy radiation passing through the first layer. An additional x-ray filter material, typically 0.6 mm copper, may be introduced between the elements, so that the energy separation between the low energy x-rays and the high energy x-rays is increased. In this configuration, losses in x-ray flux may occur, due to x-ray absorption in the sensor material, the substrate, and the x-ray filter material, increasing noise in the image. Also, direct conversion of x-rays to electrical signal in the photo-sensing material may occur, also increasing noise in the image.

For these reasons, an improved dual energy x-ray detector is desirable.

SUMMARY

An x-ray detector may include one or more x-ray detector elements. Each of the detector elements may be configured to measure x-ray attenuation at two different energies. Each of the x-ray detector elements may include a first scintillator element configured to convert the x-rays from the x-ray source into light having a first wavelength. Each x-ray detector element may further include a second scintillator element in optical contact with the first scintillator element. The second scintillator element may be configured to convert x-rays from the x-ray source that have passed through the first scintillator element into light having a second wavelength. Each x-ray detector element may further include a first optical sensor that is configured to detect the light from the first and second scintillators, and that has a spectral sensitivity substantially matched to the first wavelength. Each x-ray detector element may further include a second optical sensor that is configured to detect the light from the first and second scintillators, and that has a spectral sensitivity substantially matched to the second wavelength.

A method of determining a property of a material may include converting x-rays that are generated by an x-ray source and that have passed through an object that includes the material, into light having a first wavelength, using a first scintillator element. The method may further include converting x-rays from the x-ray source that have passed through the object and that have also passed through the first scintillator element into light having a second wavelength, using a second scintillator element. The method may further include detecting light from the first and the second scintillator elements, with a first optical sensor having a spectral sensitivity substantially matched to the first wavelength. The method may further include detecting light from the first and second scintillator elements, with a second optical sensor having a spectral sensitivity substantially matched to the second wavelength.

In the following detailed description wherein several embodiments are shown and described, simply by way of illustration of the best mode of the disclosure. As will be realized, the disclosure is capable of other and different embodiments, and its several details are capable of modifications in various respects, all without departing from the disclosure. Accordingly, the drawings and description that follow are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present disclosure, reference should be had to the following detailed description taken in connection with the accompanying drawings in which the same reference numerals are used to indicate the same or similar parts wherein.

DETAILED DESCRIPTION

An improved dual energy x-ray detector element is disclosed that can more fully utilize x-ray radiation incident upon the detector element, while substantially eliminating losses in filters or sensor substrate. Noise in a resulting CT or radiographic image can be minimized.

Figure 1:
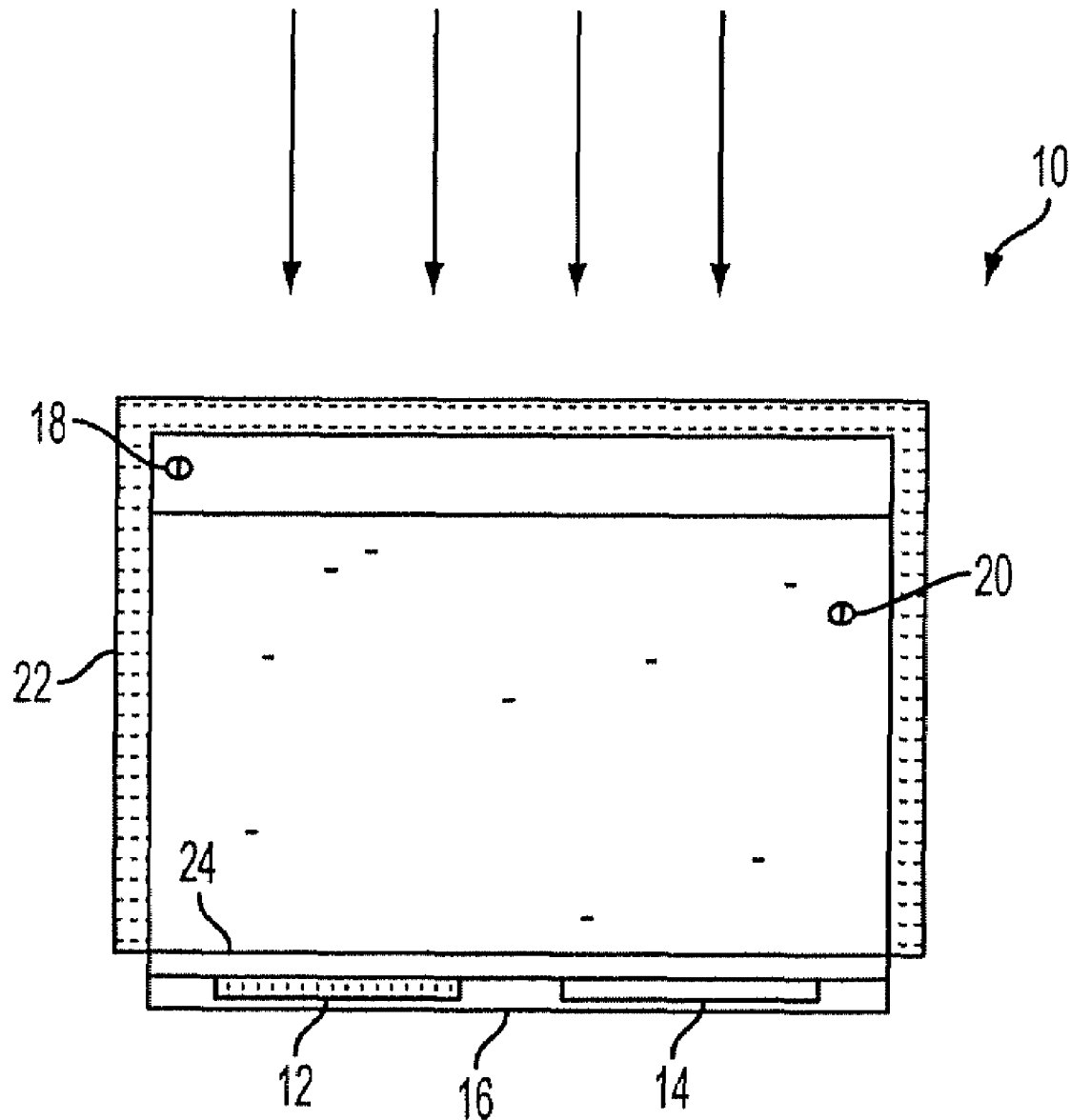
FIG. 1 is a cross-sectional view of an exemplary embodiment of a dual-energy x-ray detector element constructed in accordance with the present disclosure.

FIG. 1 illustrates an exemplary embodiment of an x-ray detector element constructed in accordance with one embodiment of the present disclosure. In overview, the x-ray detector element includes a two-layered scintillator, and a single chip two-channel sensor. In particular, the x-ray detector element includes a first scintillator and a first sensor that are mostly sensitive to relatively low energy x-rays, and a second scintillator and a second sensor that are mostly sensitive to relatively high energy x-rays.

FIG. 1 shows an x-ray detector element 10, which includes a first scintillator element 18 adapted to convert incident x-rays, which are generated by an x-ray source (not shown) and which have passed through an object, into luminescence light of the first wavelength $\lambda 1$. The x-ray detector element 10 further includes a second scintillator element 20 adapted to convert x-ray radiation into luminescence light of a second wavelength $\lambda 2$. The first scintillator element 18 may be a scintillator layer 18 made of a first scintillator material, and the second scintillator element 20 may be a scintillator layer 20 made of a second scintillator material different from the first scintillator material.

The first scintillator layer 18 is positioned in front of the second scintillator layer 20, as illustrated. The second scintillator layer 20 is thus configured to convert x-rays from the x-ray source that have passed through the object and through the first scintillator layer into light of the second wavelength $\lambda 2$. In this way, the first scintillator layer 18 is more sensitive to lower energy x-rays, and the second scintillator layer 20 is more sensitive to higher energy x-rays, i.e. to the x-rays having sufficient energy to be transmitted through the first scintillator layer 18 without becoming absorbed. The x-ray detector element 10 further includes a first optical sensor 12 having a spectral sensitivity matched to light of the first wavelength $\lambda 1$, and a second optical sensor 14 having a spectral sensitivity matched to light of the second wavelength $\lambda 2$.

A light reflector 22 may be disposed between the x-ray source and the scintillators 18 and 20, as well as on the sides of the scintillators 18 and 20. The light reflector 22 may be configured to increase light collection from the scintillators onto the sensors, by containing incident light and preventing the light from escaping. In the illustrated embodiment, the light reflector 22 is shown as covering contiguous sides of the first and the second scintillator layers 18, 20, 14, as well as a top surface of the first scintillator layer 18.

In the embodiment shown in FIG. 1, polychromatic x-rays enter the x-ray detector element 10, and are partially absorbed in the first scintillator layer 18, creating luminescence light of the first wavelength $\lambda 1$. As shown, the first scintillator layer 18 is thinner than the second layer 20, and is more sensitive to lower energy x-rays. According to one exemplary embodiment, the total thickness of scintillator layers 18, 20 may be from about 1.0 mm to about 10.0 mm.

Hardened x-rays that are transmitted through the first scintillator layer 18 (without being absorbed) are then almost completely absorbed in the thicker second scintillator layer 20, giving rise to luminescence light of the second wavelength $\lambda 2$. The second scintillator layer 20 transmits scintillation light of wavelengths $\lambda 1$ and $\lambda 2$ to the sensors 12 and 14. As mentioned above, the first sensor 12 is mostly sensitive to wavelength $\lambda 1$, while the second sensor 14 is mostly sensitive to wavelength $\lambda 2$. The second scintillator layer 20 is sufficiently transparent to light of the first wavelength, i.e. is sufficiently transparent to waveguide the light of wavelengths $\lambda 1$ and $\lambda 2$ to the sensors 12, 14. The scintillator layers 18, 20 almost totally absorb incident x-ray radiation, so that x-ray direct interaction with the sensors 12 and 14 is negligibly small.

In one embodiment, the optical sensors 12 and 14 may be silicon p-i-n photodiodes, and may be disposed side by side on a single silicon substrate 16 to form a single silicon chip, as shown in the embodiment illustrated in FIG. 1. The respective output signals of the dual channel optical sensors 12 and 14 separate the low-energy and the high-energy x-ray intensities incident upon the x-ray detector. The selective spectral sensitivity of the sensors may be provided via chip design of the silicon chip, for example. The separation between the low energy x-rays and high energy x-rays may be simply achieved by filtering the x-ray beam through an appropriate and optimized thickness of the first scintillator layer. Alternatively, the selective spectral sensitivity may be provided through an optical interface having variable spectral transmissivity, between the second scintillator 20 and the sensors 12 and 14, for example. Other techniques known in the art may be used. In the illustrated embodiment, an optical filter 24 is located between the two sensors (12 and 14) and the second scintillator layer 20 to provide the requisite selective spectral sensitivity.

Alternatively, the variable transmission filter can be configured in such a way that the sensor 12 is sensitive to the total emission spectrum $\lambda 1+\lambda 2$ of the scintillators 18 and 12, while the sensor 14 is sensitive to only one of the wavelengths $\lambda 1$ (or $\lambda 2$). In this case, the sensor 12 becomes sensitive to total absorbed x-ray energy, and the sensor 14 becomes a low energy sensor in the case in which it is sensitive to $\lambda 1$, or becomes a high energy sensor in the case in which it is sensitive to $\lambda 2$. Signal subtraction may allow estimation of both low-energy and high energy signals.

Among other advantages, the dual energy detector element 10 of the present disclosure may fully utilize the x-ray photons incident upon the x-ray detector, with substantially no losses in interlayer sensor substrates, and in x-ray filters. In this way, the CT or radiographic image noise may be minimized. The signal-to-noise ratio of a dual energy detector built according to FIG. 1, as well as the signal-to-noise ratio of a dual energy detector built according to the method described in paragraph 005 above, have been simulated, and compared with each other. In both cases, the low energy detector was made of ZnSe(Te), and the high-energy detector was made of CdWO$_4$. The x-ray spectrum was produced by a tungsten anode x-ray tube at 166 kVp, and the object consisted of 10 cm of water. For the detector built in accordance with paragraph [005], a 0.6 mm thick Copper filter was used. For an optimal thickness of the low energy scintillator and high energy scintillator, which was 0.38 mm and 3.0 mm, respectively, the total signal-to-noise ratio was improved by 16% in the case of the dual energy detector built in accordance with FIG. 1. Accordingly, the same signal-to-noise ratio as was obtained using the method described in paragraph [005] could be achieved with an x-ray dose that is about 35% lower.

Also, the dual energy detector element 10 is relatively easy to manufacture, and is relatively inexpensive to manufacture, because the different wavelength sensors are parts of the same photodetector chip.

Figure 2:
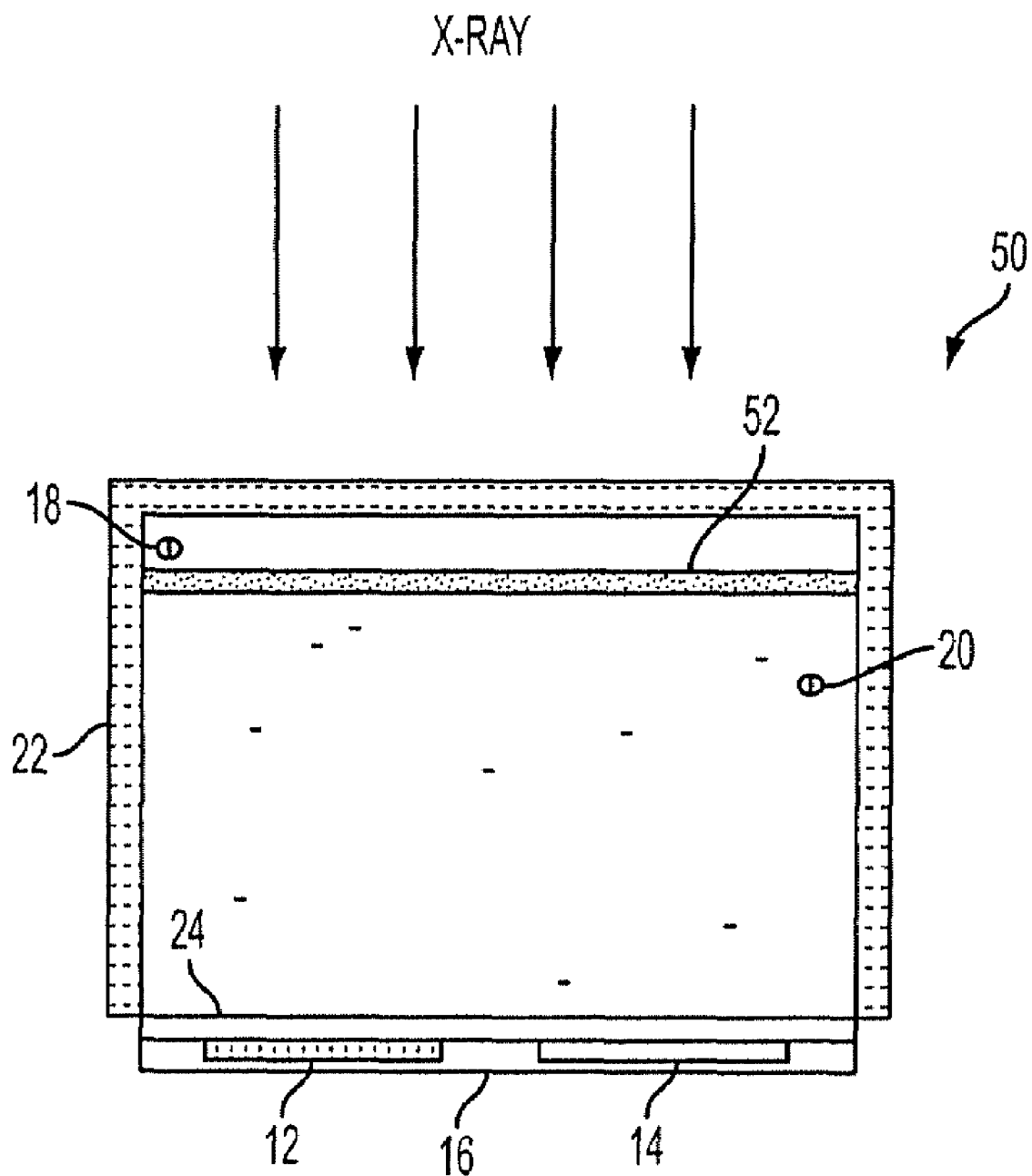
FIG. 2 is a cross-sectional view of another exemplary embodiment of a dual-energy x-ray detector element constructed in accordance with the present disclosure.

FIG. 2 shows another exemplary embodiment of a dual-energy x-ray detector element 50 constructed in accordance with the present disclosure. The detector element 50 of FIG. 2 is similar to the detector element 10 of FIG. 1 such that similar elements have the same reference numerals. In the embodiment illustrated in FIG. 2, the detector element 50 of FIG. 2 includes an additional optical filter 52, positioned between the first scintillator layer 18 and the second scintillator layer 20. The filter 52 enables the use of a greater variety of scintillator materials for the first scintillator layer 18, including materials with a wide emission wavelength, or with multiple emission wavelengths, and including materials with emission bands that overlap with the emission wavelength $\lambda 2$ of the second scintillator layer 20.

According to one exemplary embodiment of the present disclosure, the scintillator material for the first scintillator layer 18 may include gadolinium oxisulfite ceramic (GOS: Pr, Ce, F). In the case of a 120 kVp x-ray spectrum, the thickness of the first scintillator layer may be in the range of about 0.03 mm to about 0.06 mm. In this embodiment, the scintillator material for the second scintillator layer 20 may include a cadmium tungstate single crystal ($CdWO_4$) having a thickness of about 2 mm to about 3 mm. The first sensor 12 may have a 600 nm lowpass filter, while the second sensor 14 may have a 600 nm highpass filter. An additional 600 nm lowpass filter 24 may be provided between the first scintillator layer 18 and the second scintillator layer 20, as illustrated in FIG. 2. This exemplary embodiment may perform well for CT detecting when low afterglow detectors are required.

According to another exemplary embodiment of the present disclosure, the scintillator material for the first scintillator layer 18 may be a doped Zinc Selenide (ZnSe). In the case of a 120 kVp x-ray spectrum, the thickness of the ZnSe scintillator layer may be in the range of about 0.03 mm to about 1.00 mm. In this embodiment, the scintillator material for the second scintillator layer 20 may be a cadmium tungstate single crystal ($CdWO_4$) having a thickness of about 2 mm to about 3 mm. In this embodiment, the first sensor 12 may have a 600 nm lowpass filter, while the second sensor 14 may have a 600 nm highpass filter. An additional 600 nm lowpass filter 24 may be provided between the first scintillator layer 18 and the second scintillator layer 20.

According to yet another exemplary embodiment of the present disclosure, the scintillator material for the first scintillator layer 18 may include a CsI-Na crystal, and the thickness of the first scintillator layer 18 may be from about 0.5 mm to about 1.0 mm. The scintillator material for the second scintillator layer 20 may include a CsI-Tl crystal, and the thickness of the second scintillator layer 20 may be from about 3 mm to about 5 mm. The maximum of CsI-Na emission is at about 420 nm, while the maximum CsI-Tl emission is at about 560 nm. In order to separate the signals, the first sensor 12 may have a 450 nm lowpass optical filter, while the second sensor 14 may have a 550 nm highpass optical filter. The combination described in this paragraph may have the advantage of using high output scintillators, and may be used in radiographic applications, when low afterglow is not required.

The above embodiments have been described as selected ones of many possible different embodiments. Other embodiments of the present disclosure may use scintillator materials for the first and second scintillator elements that are different from the materials described above. Also, the first and second scintillator elements may have different sizes and shapes.

Figure 5:
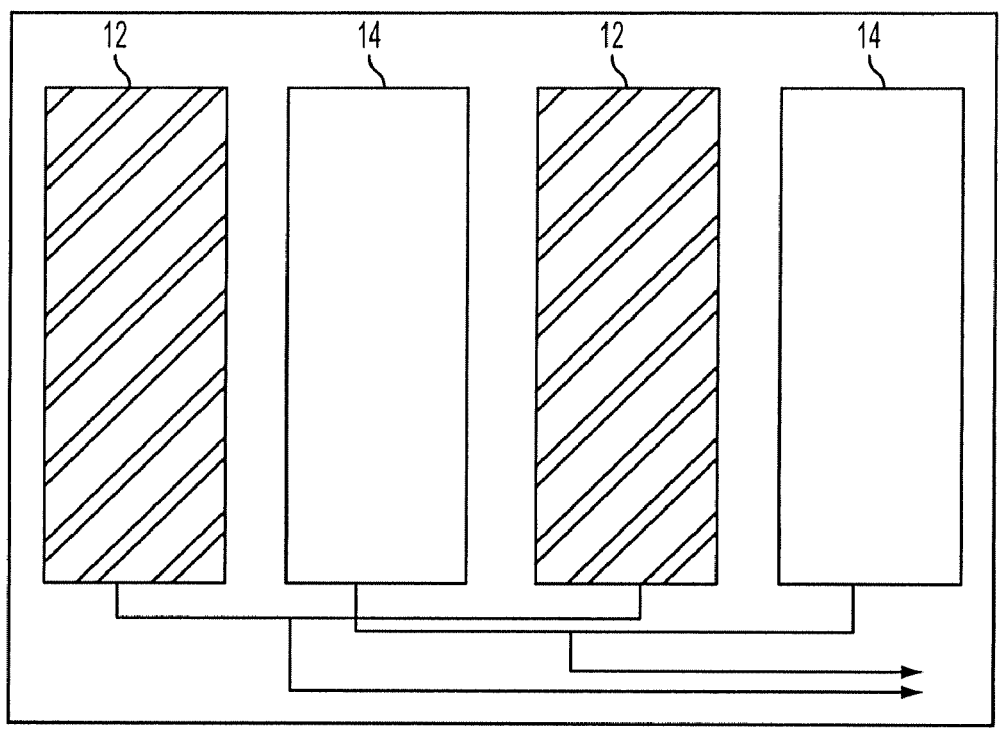
FIG. 5 illustrates an example of a dual-energy x-ray detector that has two optical sensors, each optical sensor including two parts.

The sensors 12 and 14 may also have different shapes and configurations, designed to improve spatial uniformity of the sensor sensitivity to wavelength $\lambda 1$, and $\lambda 2$. FIG. 5 illustrates an example of one such configuration, in which each of the sensors 12 and 14 consists of two parts. The two parts of each sensor are electrically connected on the silicon chip by metal traces, and create one output signal. In this configuration, as well as in similar configurations, the spatial distribution of the sensors 12 and 14 may better match the distribution of the absorbed x-ray photons.

Figure 3:
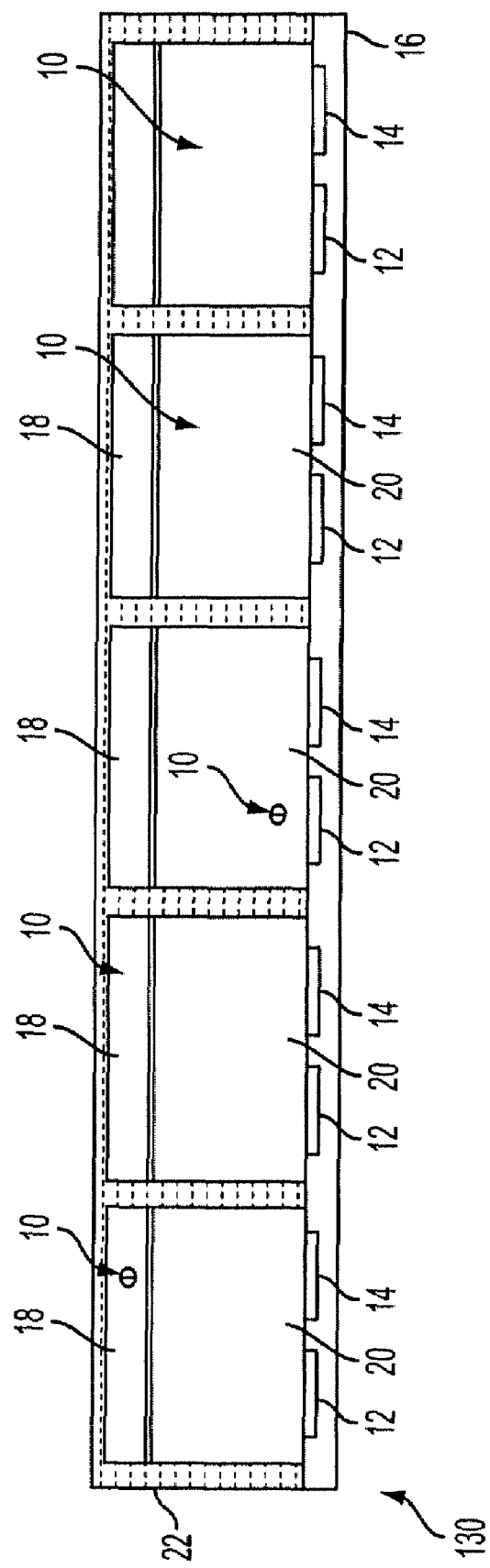
FIG. 3 is a cross-sectional view of a portion of an exemplary embodiment of a dual-energy x-ray detector array including a plurality of the detector elements of FIG. 1.

FIG. 3 illustrates a dual-energy x-ray detector array 130 which includes a plurality of the detector elements 10 of FIG. 1. In FIG. 3, a one-dimensional array of detector elements is illustrated. In other embodiments, the array 130 may also be two-dimensional, as in a multi-slice CT detector, or one-dimensional. The number of detector elements in the array 130 may range from about 16 to about 32. The pitch of the array 130 can be between 1.0 mm and 2.0 mm. It should of course be understood that the geometric shape and size for the dual-energy x-ray detector array 130, as well as the number of elements in the detector array 130, are not restricted to the specific embodiment described in conjunction with FIG. 3, and that many variations are possible.

Figure 4:
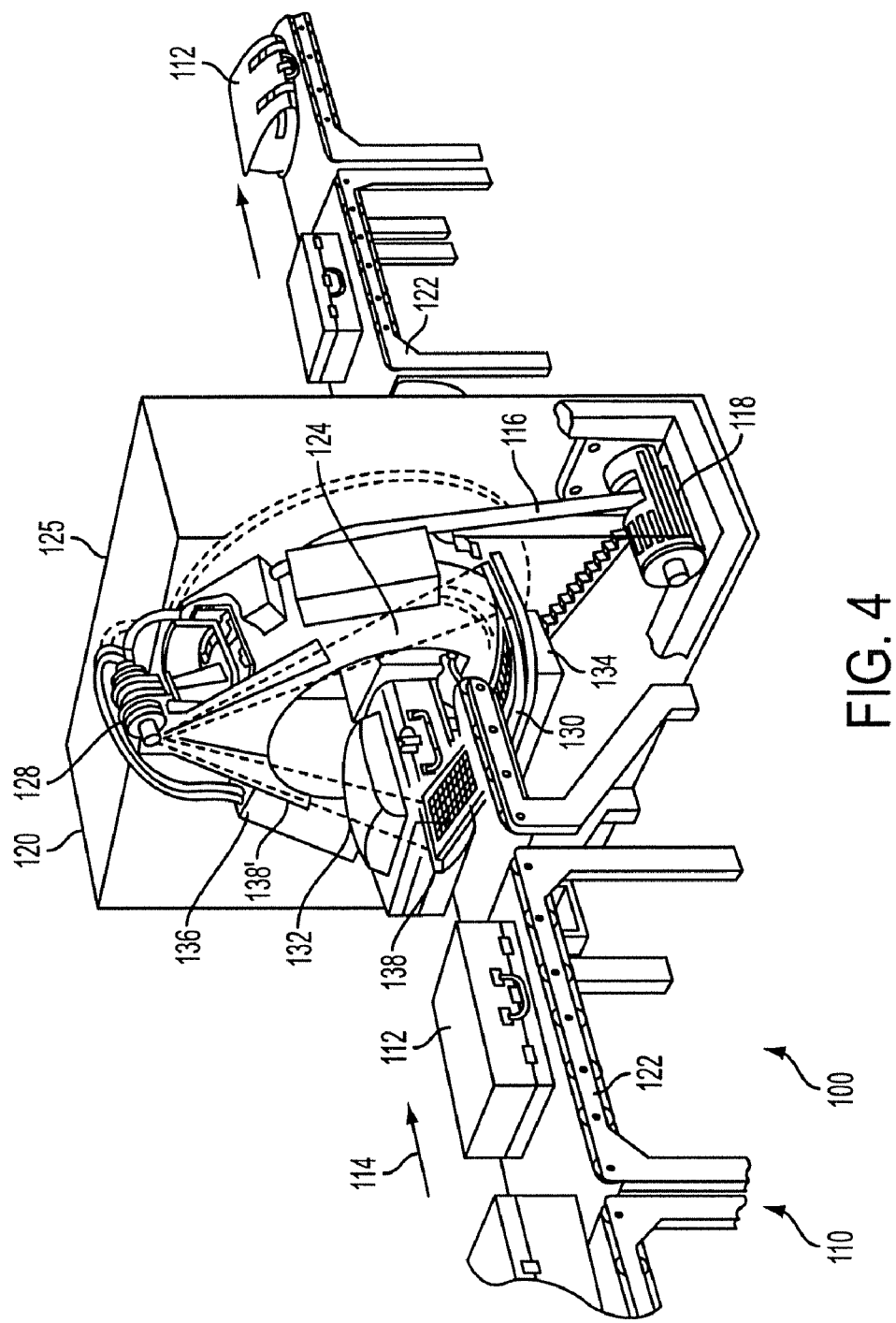
FIG. 4 is a perspective view of an exemplary embodiment of a CT baggage scanning system including the detector array of FIG. 3.

FIG. 4 shows an exemplary embodiment of a CT baggage scanning assembly 100, which includes the x-ray detector array 130 illustrated in FIG. 2. The x-ray detector array 130 may include a plurality of new and improved dual energy detector elements constructed according to the present disclosure. The CT baggage scanning assembly of FIG. 4 will be described, as one possible use for the dual energy x-ray detector described above.

The scanning assembly 100 may include a conveyor system 110 for continuously conveying baggage, or luggage, 112 in a direction indicated by arrow 114 through a central aperture of a CT scanning system 120. The conveyer system 110 is illustrated as including a plurality of individual conveyor sections 122, however, other forms of conveyor systems may of course be used. The CT scanning system 120 may include an annular shaped rotating platform or disk 124 disposed within a gantry support 125 for rotation about a rotation axis that is preferably parallel to the direction of travel of the baggage 112, which is indicated by arrow 114. Rotating platform 124 may define a central aperture 126 through which conveyor system 110 transports the baggage 112. System 120 may include an x-ray tube 128 which is disposed on a diametrically opposite side of the platform 124 from the detector array. System 120 may further include a data acquisition system 134 for receiving and processing signals generated by the detector array 130, and an x-ray tube control system 136 for supplying power to, and otherwise controlling the operation of, x-ray tube 128. The system 120 may also preferably be provided with a computerized system (not shown) for processing the output of the data acquisition system 134 and for generating the necessary signals for operating and controlling system 120. The computerized system can also include a monitor 140 for displaying information including generated images. The system 120 may also include shields 138, which may be fabricated from lead, for example, for preventing radiation from propagating beyond gantry 125.

In operation, x-ray tube 128 may generate a pyramid-shaped beam, often referred to as a "cone" beam, 132 of x-rays that pass through a three dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam may therefore define a scanning volume of space. Platform 124 rotates about its rotation axis 127, thereby transporting x-ray source 128 and detector array 130 in circular trajectories about baggage 112 as the baggage is continuously transported through central aperture 126 by conveyor system 110 so as to generate a plurality of projections at a corresponding plurality of projection angles.

Signals from the detector array 130 may be initially acquired by data acquisition system 134, and subsequently processed by a computerized system (not shown) using CT scanning signal processing techniques. The processed data can be displayed on a monitor 140, and/or can also be further analyzed by the computerized system to determine the presence of a suspected material, as for example, reviewing the data to determine whether the data suggests the presence of material having the density (and when a dual energy system is used, molecular weight) of explosives.

As stated above, the detector array 130 may be a two dimensional array of detectors preferably capable of providing scan data in both the directions of the X- and Y-axes, as well as in the Z-axis direction. The detector array 130 may include a plurality of linear detector arrays, or a plurality of rows of detectors. During each measuring interval, the plurality of detector rows generate data from a corresponding plurality of projections and thereby simultaneously scan a volumetric region of baggage 112. The dimension and number of the detector rows are preferably selected as a function of the desired resolution and throughput of the scanner, which in turn is a function of the rotation rate of rotating platform 124 and the speed of conveying system 110.

Although a CT scanner assembly 100 for scanning baggage has been shown in FIG. 4 as one example of a use of the dual energy x-ray detector described in the present disclosure, it should be understood that the dual energy x-ray detector of the present disclosure can be used with other types of x-ray machines, and for purposes other than dual energy CT. For example, the dual energy x-ray detector described in the present disclosure may be useful in dual energy radiography, applications for which may include bone-densitometry and explosive detection.

Since certain changes may be made in the above apparatus without departing from the scope of the disclosure herein involved, it is intended that all matter contained in the above description or shown in the accompanying drawings shall be interpreted in an illustrative and not a limiting sense.

What is claimed is:

1. A dual energy x-ray imaging detector, comprising:
an array of x-ray detector elements configured to detect x-rays in an x-ray imaging system, each x-ray detector element configured to measure x-ray attenuation by an object at two different x-ray energies so that x-ray images of the object can be generated at the two different energies;
wherein each x-ray detector element includes:
a first scintillator element configured to convert x-rays from the x-ray source that have traversed the object into light having a first wavelength;
a second scintillator element configured to convert x-rays from the x-ray source that have traversed the object and that have passed through the first scintillator element into light having a second wavelength;
a first optical sensor configured to detect the light from the first and second scintillator elements, the first optical sensor having a spectral sensitivity substantially matched to the first wavelength; and
a second optical sensor configured to detect the light from the first and second scintillator elements, the second optical sensor having a spectral sensitivity substantially matched to the second wavelength;
wherein the first scintillator element comprises gadolinium oxisulfite ceramic, and has a thickness of between about 0.03 mm and about 0.06 mm; and
wherein the second scintillator element comprises single crystal cadmium tungstate, and has a thickness of between about 2 mm and about 3 mm.

2. The x-ray detector of claim 1, wherein the first optical sensor includes a 600 nm highpass filter, and wherein the second optical sensor includes a 600 nm lowpass filter.

3. The x-ray detector of claim 1, wherein the first sensor includes a 450 nm lowpass filter, and the second sensor includes a 550 nm highpass filter.

4. The x-ray detector of claim 1, wherein at least one of the optical sensors comprises a silicon p-i-n photodiode.

5. The x-ray detector of claim 1, wherein a total thickness of the scintillator elements is between 1.0 mm and 10.0 mm.

6. The x-ray detector of claim 1, further comprising an optical filter located between the first scintillator and the second scintillator.

7. The x-ray detector of claim 1, wherein the array comprises a two-dimensional array that includes multiple rows.

8. The x-ray detector of claim 1, wherein each x-ray detector element further includes a light reflector, the light reflector disposed between the x-ray source and the scintillators and on the sides of the scintillators, the light reflector configured to increase light collection in the optical sensors.

9. The x-ray detector of claim 1, wherein the first and second optical sensors are positioned side-by-side on a single silicon chip.

10. A dual energy x-ray imaging detector, comprising:
an array of x-ray detector elements configured to detect x-rays in an x-ray imaging system, each x-ray detector element configured to measure x-ray attenuation by an object at two different x-ray energies so that x-ray images of the object can be generated at the two different energies;
wherein each x-ray detector element includes:
a first scintillator element configured to convert x-rays from the x-ray source that have traversed the object into light having a first wavelength;
a second scintillator element configured to convert x-rays from the x-ray source that have traversed the object and that have passed through the first scintillator element into light having a second wavelength;
a first optical sensor configured to detect the light from the first and second scintillator elements, the first optical sensor having a spectral sensitivity substantially matched to the first wavelength; and
a second optical sensor configured to detect the light from the first and second scintillator elements, the second optical sensor having a spectral sensitivity substantially matched to the second wavelength;
wherein the first scintillator element comprises CsI-Na, and has a thickness of about 0.5 mm and about 2.0 mm; and
wherein the second scintillator element comprises CsI-Tl, and has a thickness of between about 3 mm and about 5 mm.

11. A dual enemy x-ray imaging detector, comprising:
an array of x-ray detector elements configured to detect x-rays in an x-ray imaging system, each x-ray detector element configured to measure x-ray attenuation by an object at two different x-ray energies so that x-ray images of the object can be generated at the two different energies;
wherein each x-ray detector element includes:
a first scintillator element configured to convert x-rays from the x-ray source that have traversed the object into light having a first wavelength;
a second scintillator element configured to convert x-rays from the x-ray source that have traversed the object and that have passed through the first scintillator element into light having a second wavelength;
a first optical sensor configured to detect the light from the first and second scintillator elements, the first optical sensor having a spectral sensitivity substantially matched to the first wavelength; and
a second optical sensor configured to detect the light from the first and second scintillator elements, the second optical sensor having a spectral sensitivity substantially matched to the second wavelength;
wherein the first scintillator element comprises zinc selenide (ZnSe), and has a thickness of between about 0.03 mm and about 1 mm; and
wherein the second scintillator element comprises single crystal cadmium tungstate, and has a thickness of between about 2 mm and about 3 mm.

12. The x-ray detector of claim 11, wherein the first optical sensor includes a 600 nm highpass filter, and wherein the second optical sensor includes a 600 nm lowpass filter.

13. A method of generating x-ray images of an object at two different energies, the method comprising:
converting x-rays that are generated by an x-ray source and that have passed through an object that includes the material, into light having a first wavelength, using a first scintillator element;
converting x-rays from the x-ray source that have passed through the object and that have passed through the first scintillator element into light having a second wavelength, using a second scintillator element;
detecting light from the first and the second scintillator elements, with a first optical sensor having a spectral sensitivity substantially matched to the first wavelength; and
detecting light from the first and second scintillator elements, with a second optical sensor having a spectral sensitivity substantially matched to the second wavelength;
wherein the first and second scintillator elements and the first and second optical sensors are included in one x-ray detector element in an array of x-ray detector elements for an x-ray imaging system;
wherein the first scintillator element comprises gadolinium oxisulfite ceramic, and has a thickness of between about 0.03 mm and about 0.06 mm; and
wherein the second scintillator element comprises single crystal cadmium tungstate, and has a thickness of between about 2 mm and about 3 mm.

14. The method of claim 13, further comprising filtering the light from the first and the second scintillator elements with a lowpass filter before detecting said light with the first optical sensor.

15. The method of claim 13, further comprising filtering the light from the first and the second scintillator elements with a highpass filter before detecting said light with the second optical sensor.

16. The method of claim 13, wherein at least one of the optical sensors comprises a silicon p-i-n photodiode.

17. A method of generating x-ray images of an object at two different energies, the method comprising:
converting x-rays that are generated by an x-ray source and that have passed through an object that includes the material, into light having a first wavelength, using a first scintillator element;
converting x-rays from the x-ray source that have passed through the object and that have passed through the first scintillator element into light having a second wavelength, using a second scintillator element;
detecting light from the first and the second scintillator elements, with a first optical sensor having a spectral sensitivity substantially matched to the first wavelength; and
detecting light from the first and second scintillator elements, with a second optical sensor having a spectral sensitivity substantially matched to the second wavelength;
wherein the first and second scintillator elements and the first and second optical sensors are included in one x-ray detector element in an array of x-ray detector elements for an x-ray imaging system;
wherein the first scintillator element comprises CsI-Na, and has a thickness of about 0.5 mm and about 2.0 mm; and
wherein the second scintillator element comprises CsI-Tl, and has a thickness of between about 3 mm and about 5 mm.

18. A method of generating x-ray images of an object at two different energies, the method comprising:
converting x-rays that are generated by an x-ray source and that have passed through an object that includes the material, into light having a first wavelength, using a first scintillator element;
converting x-rays from the x-ray source that have passed through the object and that have passed through the first scintillator element into light having a second wavelength, using a second scintillator element;
detecting light from the first and the second scintillator elements, with a first optical sensor having a spectral sensitivity substantially matched to the first wavelength; and
detecting light from the first and second scintillator elements, with a second optical sensor having a spectral sensitivity substantially matched to the second wavelength;
wherein the first and second scintillator elements and the first and second optical sensors are included in one x-ray detector element in an array of x-ray detector elements for an x-ray imaging system;
wherein the first scintillator element comprises zinc selenide (ZnSe), and has a thickness of between about 0.03 mm and about 1 mm; and
wherein the second scintillator element comprises single crystal cadmium tungstate, and has a thickness of between about 2 mm and about 3 mm.

* * * * *

UNITED STATES PATENT AND TRADEMARK OFFICE
CERTIFICATE OF CORRECTION

PATENT NO. : 7,388,208 B2 Page 1 of 1
APPLICATION NO. : 11/329658
DATED : June 17, 2008
INVENTOR(S) : Ruvin Deych It is certified that error appears in the above-identified patent and that said Letters Patent is hereby corrected as shown below:

IN THE CLAIMS:

Column 8, line 64, delete "enemy" and replace with "energy".

Signed and Sealed this

Second Day of December, 2008

JON W. DUDAS
*Director of the United States Patent and Trademark Office*